United States Patent [19]
Yatomi

[11] Patent Number: 6,141,177
[45] Date of Patent: Oct. 31, 2000

[54] SIGNAL REPRODUCING DEVICE AND METHOD WITH TRACKING ERROR FORMATION

[75] Inventor: Toshiya Yatomi, Sagamihara, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/564,561

[22] Filed: Nov. 29, 1995

[30] Foreign Application Priority Data

Nov. 30, 1994 [JP] Japan .................................. 6-297634

[51] Int. Cl.[7] .................................................. G11B 5/584
[52] U.S. Cl. ......................................... 360/77.14; 360/55
[58] Field of Search ............................. 360/77.14, 77.15, 360/73.11, 73.12, 69.71, 72.1, 72.2, 39, 40, 41, 46, 65, 55; 369/47; 386/88, 69; 375/229

[56] References Cited

U.S. PATENT DOCUMENTS

| | | | |
|---|---|---|---|
| 4,809,096 | 2/1989 | Azuma et al. ....................... | 360/77.15 |
| 4,954,905 | 9/1990 | Wakabashi et al. .................. | 360/77.03 |
| 5,140,571 | 8/1992 | Nihida et al. ......................... | 360/75 X |
| 5,167,024 | 11/1992 | Smith et al. .......................... | 360/75 X |
| 5,359,473 | 10/1994 | Kaniwa et al. ....................... | 360/77.14 |
| 5,365,232 | 11/1994 | Ido et al. ............................... | 360/40 X |
| 5,432,651 | 7/1995 | Maeno et al. ......................... | 360/40 X |
| 5,594,602 | 1/1997 | Isaka et al. ........................... | 360/77.14 |
| 5,617,268 | 4/1997 | Sakakibara et al. ................. | 360/77.14 |

*Primary Examiner*—Paul Loomis
*Assistant Examiner*—K. Wong
*Attorney, Agent, or Firm*—Fitzpatrick, Cella, Harper & Scinto

[57] ABSTRACT

A device that reproduces signals recorded on a recording medium includes a unit that forms a tracking error signal from pilot signal components recorded in the signal being reproduced. A controller controls the tracking error signal forming unit so that the tracking error signal forming unit operates under reduced power during part of the signal reproducing operation. The tracking error signal forming unit uses a digital filter and the controller controls the digital filter to vary its characteristics.

26 Claims, 7 Drawing Sheets

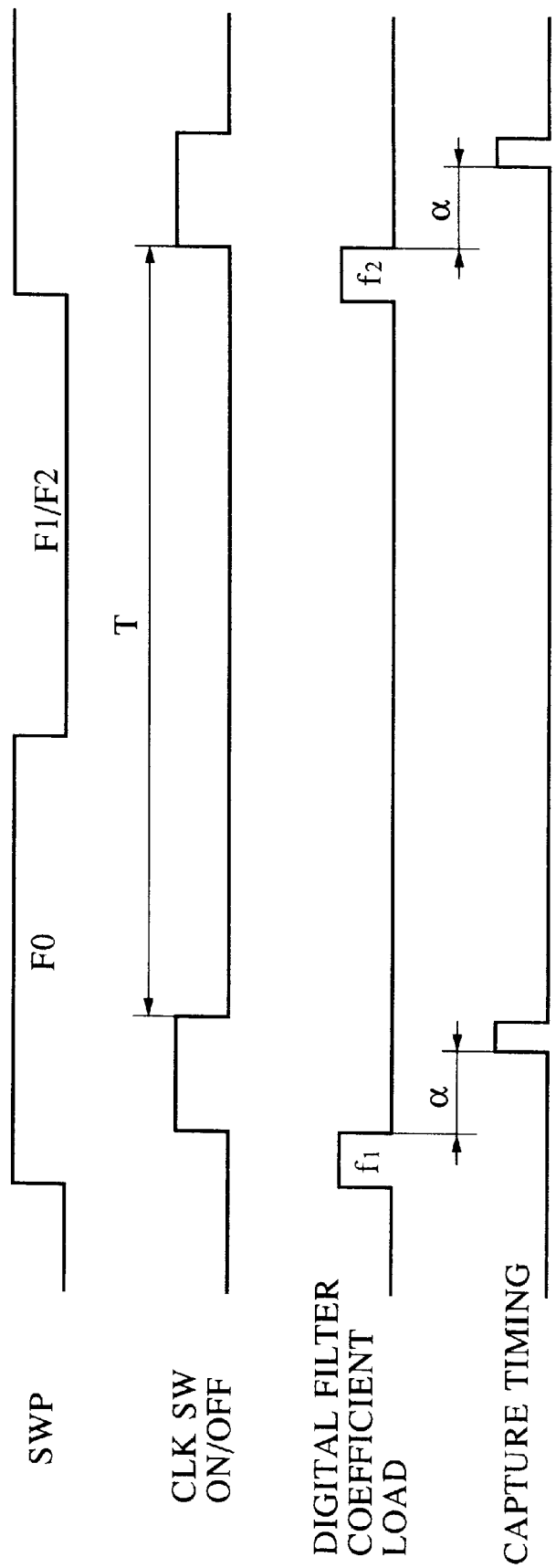

SIGNAL REPRODUCING DEVICE AND METHOD WITH TRACKING ERROR FORMATION

BACKGROUND OF THE INVENTION

1. Field of the Invention

The present invention relates to a signal reproducing device and, in particular, to a signal reproducing device for forming a tracking error signal by detecting a specific frequency component in a signal reproduced from a recording medium.

2. Description of the Related Art

FIG. 1 is a diagram showing the construction of the control circuit of a digital VTR for performing reproduction tracking control by a hitherto proposed tracking control system using two kinds of pilot signals (hereinafter referred to as the "2f ATF system").

In FIG. 1, information recorded on a magnetic tape 1 is reproduced by two rotational magnetic heads 2a and 2b which are located on a drum (not shown) and have different azimuth angles.

FIG. 2 shows the recording pattern of the tape 1.

Tracks F0 to be traced by the head 2a and tracks F1 and F2 to be traced by the head 2b are alternately formed on the tape 1. Pilot signals whose frequency is $f_1$ and pilot signals whose frequency is $f_2$ are alternately recorded on the tracks F1 and F2 respectively. On the tracks F0, practically no pilot signals are recorded.

In FIG. 1, after having been amplified by reproduction amplifiers 3a and 3b, reproduction signals of the heads 2a and 2b are alternately extracted through a switch 4, which is changed over by switching pulses SWP, and output to an A/D converter 5 and an ATF circuit 6. The reproduction signals digitized by the A/D converter 5 are supplied to a video processing circuit on the output side.

FIG. 3 shows the frequency characteristics of a reproduction signal. As shown in the drawing, pilot signal components $f_1$ and $f_2$ are included in a reproduction video signal. The $f_1$ and $f_2$ components consist of those components which are obtained when the pilot signals of $f_1$ and $f_2$ components recorded on the tracks F1 and F2 are reproduced as crosstalk during reproduction on the adjacent tracks, the tracks F0, by the head 2a.

The reproduction signals output to the ATF circuit 6 are input to band pass filters (BPF) 7a and 7b, where the $f_1$ and $f_2$ components are extracted from them. The extracted $f_1$ and $f_2$ components are supplied to detection circuits 8a and 8b, where their respective levels are detected. Signals indicating the detected levels are averaged through low-pass filters (LPF) 9a and 9b, and then digitized by A/D converters 10a and 10b before they are supplied to a computing section 11.

The computing section 11 takes in the levels of the $f_1$ and $f_2$ components on the basis of the above-mentioned SWP pulses, and calculates the difference in level between them to thereby output an ATF error signal indicating the offset amount of the head and track. This ATF signal is added to a capstan servo circuit on the output side, whereby the phase of the head and track is controlled. The polarity of this AFT error signal is inverted for each track by the switching pulses SWP.

In the above-described prior-art example, shown in FIG. 1, the ATF circuit 6 for obtaining off-track amount is formed by two circuit systems in order to extract the frequency components $f_1$ and $f_2$ of the pilot signals recorded on the tracks F1 and F2 adjacent to the tracks F0 on either side thereof. These two circuit systems continue to operate from the instant of turning ON to that of turning OFF of the power source of the VTR, with the result that the following problems occur:

(1) The ATF circuit 6 is allowed to operate even during a period in which there is no need to obtain the off-track amount, for example, during the period in which the head 2b traces the tracks F1 and F2, resulting in a waste of electric power.

(2) There is no difference in accuracy in the requisite off-track amount and responsiveness between the dubbing mode, insert mode and normal reproduction mode, which means no optimization is attained.

SUMMARY OF THE INVENTION

It is an object of the present invention to solve the problems as described above.

Another object of the present invention is to provide a signal reproducing device of the above-described type which is capable of keeping power consumption to a minimum.

To achieve these objects, there is provided, according to an aspect of the present invention, a signal reproducing device including a reproduction unit for reproducing signals recorded on a recording medium; a formation unit for forming a tracking error signal on the basis of pilot signal components in reproduction signals from the reproduction unit; and a control unit for controlling the formation unit such that a reduction in power consumption is attained in at least part of the formation unit during a part of the operating period of the reproduction unit.

Due to the above construction, the requisite power consumption for the formation of the tracking error signal can be minimized and it is possible, especially in a portable-type device, to achieve an extension of periods of use.

Still another object of the present invention is to provide a signal reproducing device capable of varying the tracking error signal formation for optimum characteristics as needed and, further, making it possible to realize a simplification in circuit configuration.

To achieve the above object, there is provided, according to another aspect of the present invention, a signal reproducing device including a reproduction unit for reproducing signals recorded on a recording medium; a formation unit including a digital filter and serving to form a tracking error signal on the basis of pilot signal components in reproduction signals from the reproduction unit; and a control unit for varying the characteristics of the digital filter.

Due to the above construction, it is possible to realize, with a single circuit, a tracking error signal formation with characteristics corresponding to the operation of a circuit or device for extracting a plurality of kinds of pilot signals, thereby realizing a substantial reduction in circuit size and greatly contributing to a reduction in device cost.

Further objects and features of the present invention will become apparent from the following detailed description of embodiments of the invention with reference to the drawings.

BRIEF DESCRIPTION OF THE DRAWINGS

FIG. 9 is a timing chart for illustrating another example of the operation of the device of FIG. 7.

DETAILED DESCRIPTION OF THE PREFERRED EMBODIMENTS

Embodiments of the present invention will now be described in detail with reference to the drawings.

Figure 4:
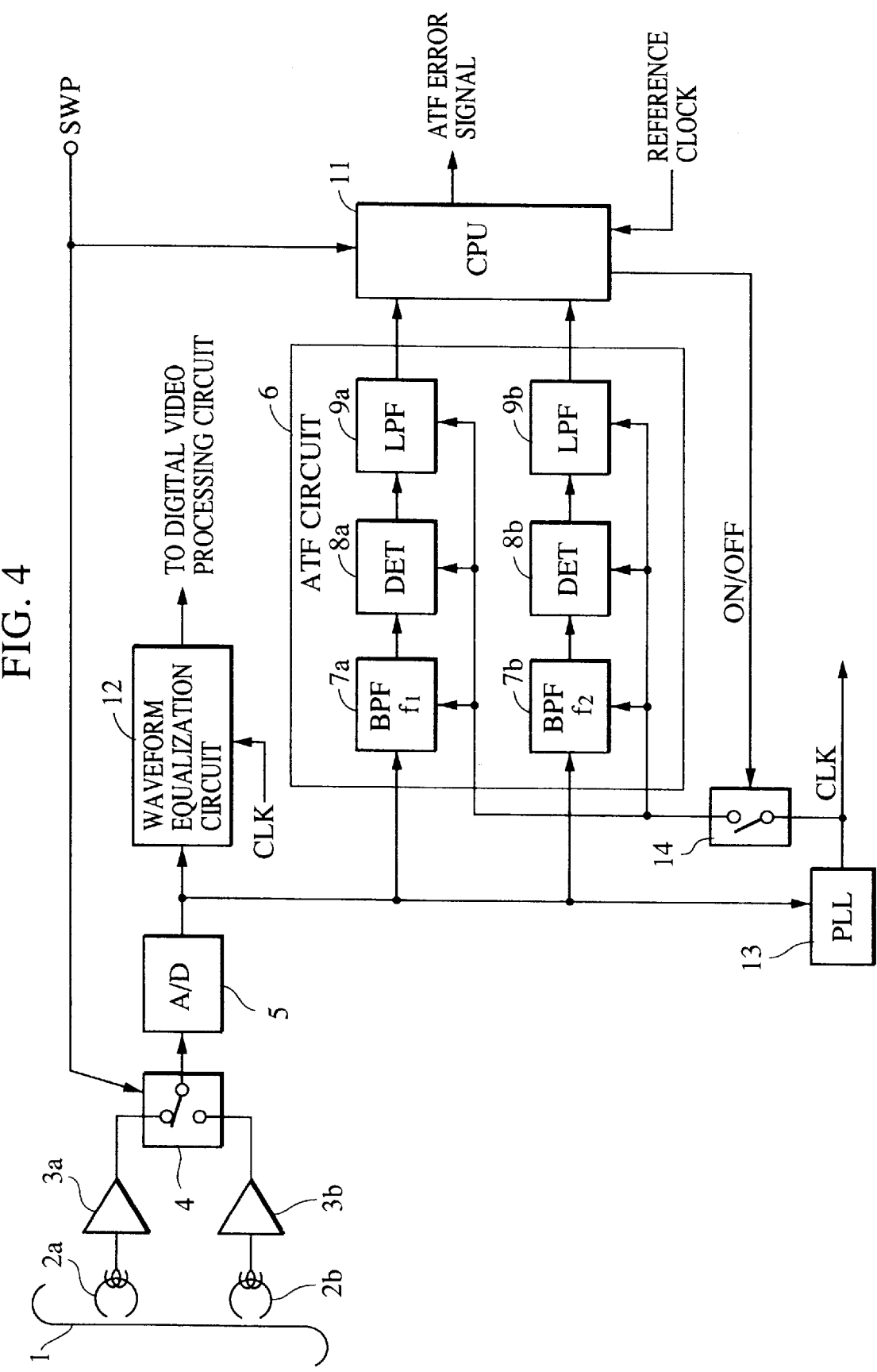
FIG. 4 is a block diagram showing the construction of the reproduction system of a digital VTR as an embodiment of the present invention.

FIG. 4 shows a first embodiment of the present invention. In the drawing, the components which have substantially the same functions as those of FIG. 1 will be indicated by the same reference numerals, and a description of such components will be omitted.

Figure 1:
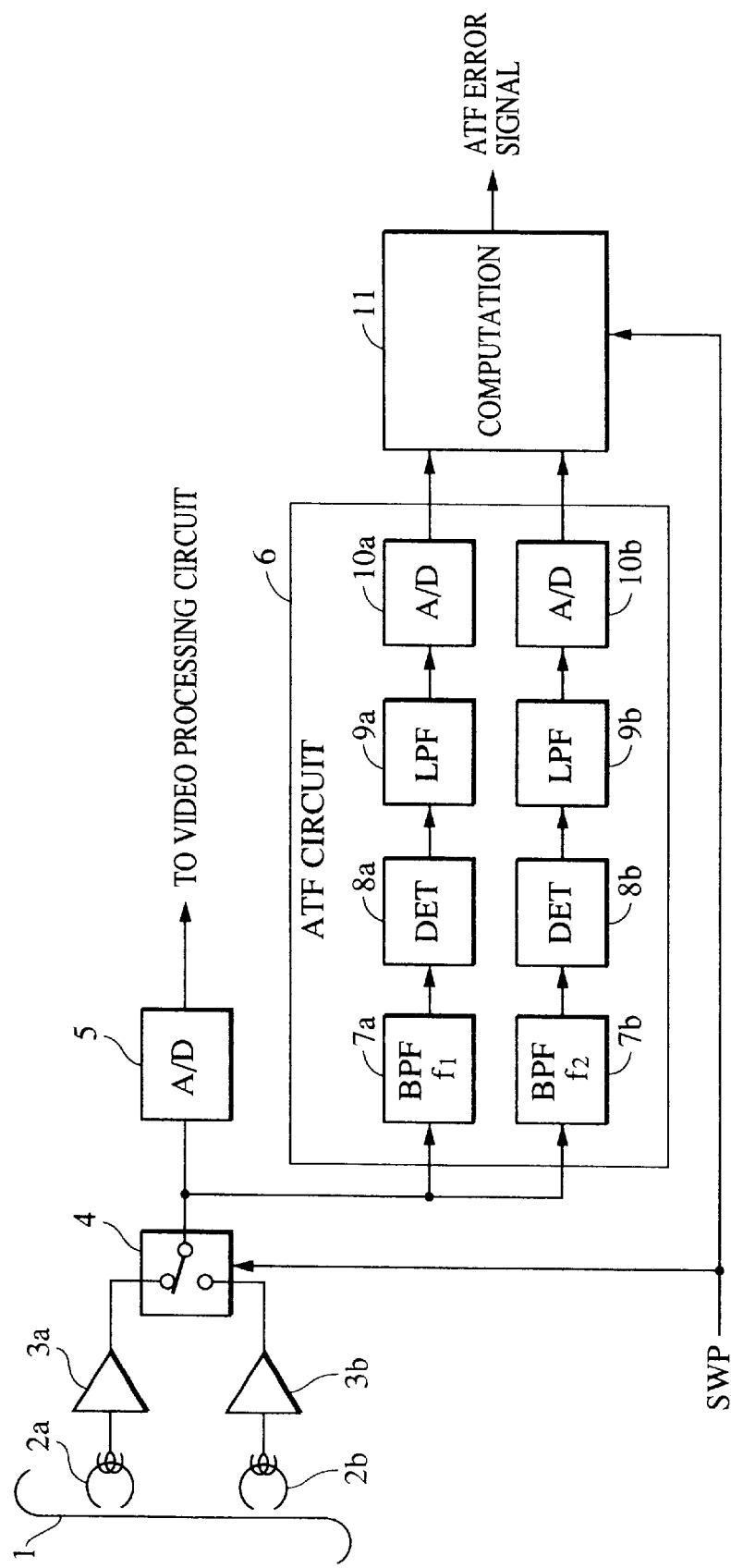
FIG. 1 is a block diagram showing the construction of a known common tracking control circuit.

While in FIG. 1 the ATF circuit 6 is provided on the output side of the switch 4, the ATF circuit 6 shown in FIG. 4 is provided on the output side of the A/D converter 5. Thus, the BPFs 7a and 7b and the LPFs 9a and 9b are formed by digital filters, and the detection circuits 8a and 8b also have a digital construction.

In FIG. 4, numeral 12 indicates a waveform equalization circuit for converting the waveform of a digital reproduction signal obtained from the A/D converter 5 to the original digital signal on the basis of clocks CLK to be described below; numeral 13 indicates a PLL circuit for generating the clocks CLK, which are phased-locked with respect to digital reproduction signals from the A/D converter 5; and numeral 14 indicates a clock switch (CLKSW) for supplying the clocks CLK to the ATF circuit 6 by being ON/OFF-controlled by a control signal from the control section 11.

Next, the operation of this embodiment, constructed as described above, will be described with reference to FIG. 5.

In this embodiment, a reproduction signal obtained from the switch 4 and having an analog waveform is converted to a digital reproduction signal by the A/D converter 5, and this digital reproduction signal is applied to the ATF circuit 6 and, further, to the waveform equalization circuit 12. The waveform equalization circuit 12 restores the above digital reproduction signal to the original digital data as recorded on the tape 1 on the basis of the clocks CLK from the PLL circuit 13, and supplies it to a digital video processing circuit on the output side.

Figure 5:
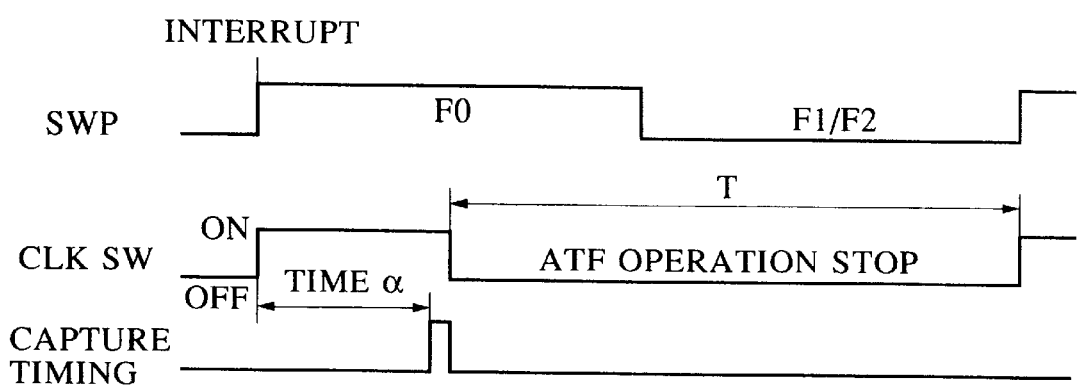
FIG. 5 is a timing chart for illustrating an example of the operation of the device of FIG. 4.

In the control section 11, an interrupt is generated by the leading edge of the SWP pulse of FIG. 5. Simultaneously with the generation of this interrupt, the switch 14 is turned ON to supply the clocks CLK to the ATF circuit 6, thereby operating the ATF circuit 6.

Figure 2:
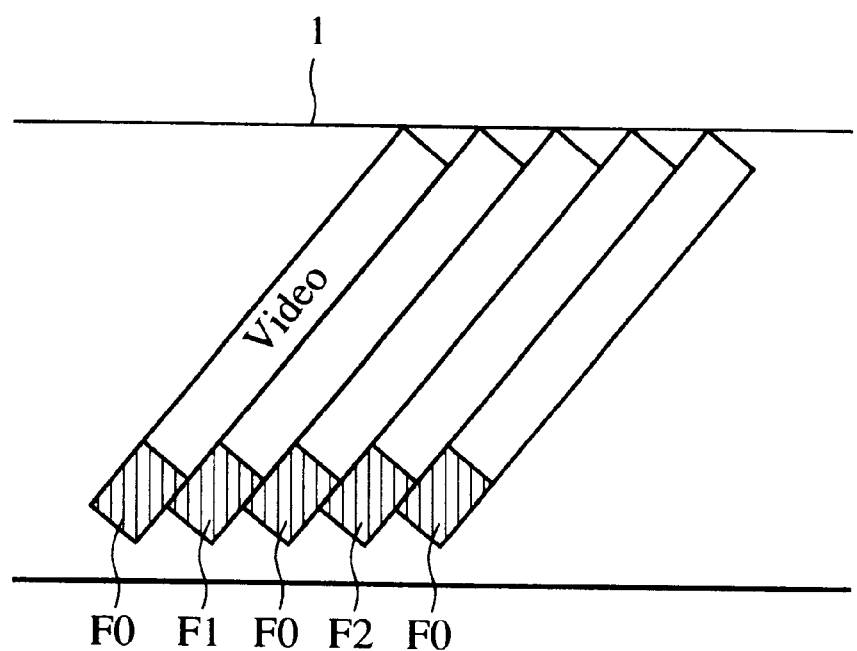
FIG. 2 is a diagram illustrating a recording pattern on a magnetic tape, which is a prerequisite for the circuit of FIG. 1.
Figure 3:
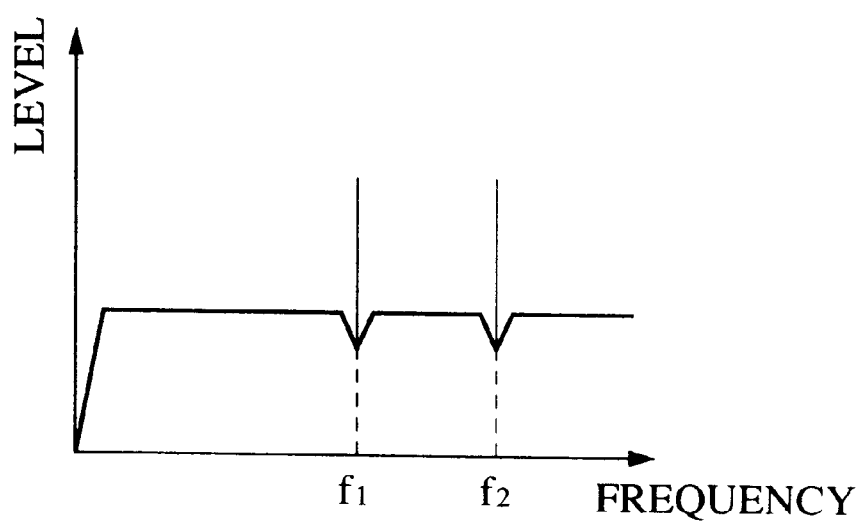
FIG. 3 is a diagram showing the frequency characteristics of a reproduction signal reproduced from the recording pattern of FIG. 2.

This enables the ATF circuit 6 to perform an ATF processing like that in the case of FIG. 1 described above through digital processing during the period in which the head 2a traces the F0 tracks of FIG. 2, and generates level signals of the components $f_1$ and $f_2$ of the pilot signals, transmitting the level signals to the control section 11.

The control section 11 starts counting reference clocks upon the generation of the interrupt with an internal counter. After a fixed time $\alpha$ has elapsed, the control section takes in the level signals of the components $f_1$ and $f_2$. This time $\alpha$ is the requisite time for stabilizing the operation of the ATF circuit 6.

Upon taking in the above level signals, the control section 11 turns OFF the switch 14, and stops the supply of clocks to the ATF circuit 6 to thereby stop the operation of the ATF circuit 6. This suspension of the operation is held until the completion of the tracing of the F1/F2 tracks by the head 2b.

That is, in the ATF circuit 6, ATF processing is executed by using the $f_1$ and $f_2$ components due to the crosstalk extracted when the F0 tracks are traced by the head 2a, and no ATF processing is conducted when the head 2b is tracing the tracks F1 and F2. Thus, the supply of clocks CLK is suspended to suspend the operation until the interrupt due to the leading edge of the SWP pulse is generated again. Thus, as shown in FIG. 5, the operation is suspended throughout the period T, which is between the instant the level signals are taken in the ATF circuit 6 during the tracing of the tracks F0 and the instant the tracing of the tracks F1 and F2 is completed. Thus, a waste of electric power is avoided.

Figure 6:
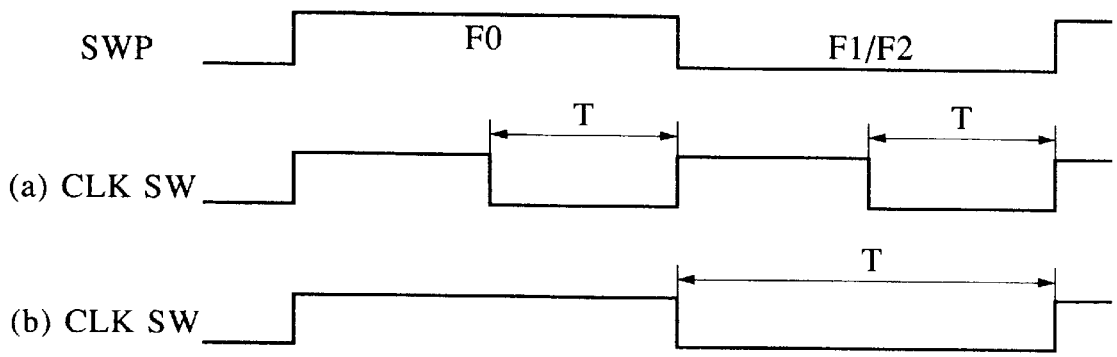
FIG. 6 is a timing chart for illustrating other examples of the operation of the device of FIG. 4.

FIGS. 6(a) and 6(b) show other embodiments of the present invention in terms of the operation stop period T.

As shown in FIG. 6(a), it is possible to suspend operation for a fixed period during each of the respective tracing periods of all the tracks. As shown in FIG. 6(b), it is also possible to detain the operation throughout the period in which the head 2a traces the tracks F1 and F2.

In the case of FIG. 6(a), both the $f_1$ and $f_2$ components due to the crosstalk components reproduced by the head 2a and the $f_1$ and $f_2$ components directly reproduced by the head 2b are used for the ATF processing. In the case of FIG. 6(b), ATF processing is performed by using only the $f_1$ and $f_2$ components directly reproduced by the head 2a.

In the first embodiment, described above, the CLKSW 14 is controlled by an ON/OFF control signal from the control section 11 as the means for controlling the operation/stoppage of the ATF circuit 6. In another embodiment, the power supplied to the ATF circuit 6 is turned ON and OFF by the above-mentioned ON/OFF control signal, whereby the same effect can be obtained. This arrangement is also applicable to an ATF circuit 6 having an analog construction as shown in FIG. 1.

Figure 7:
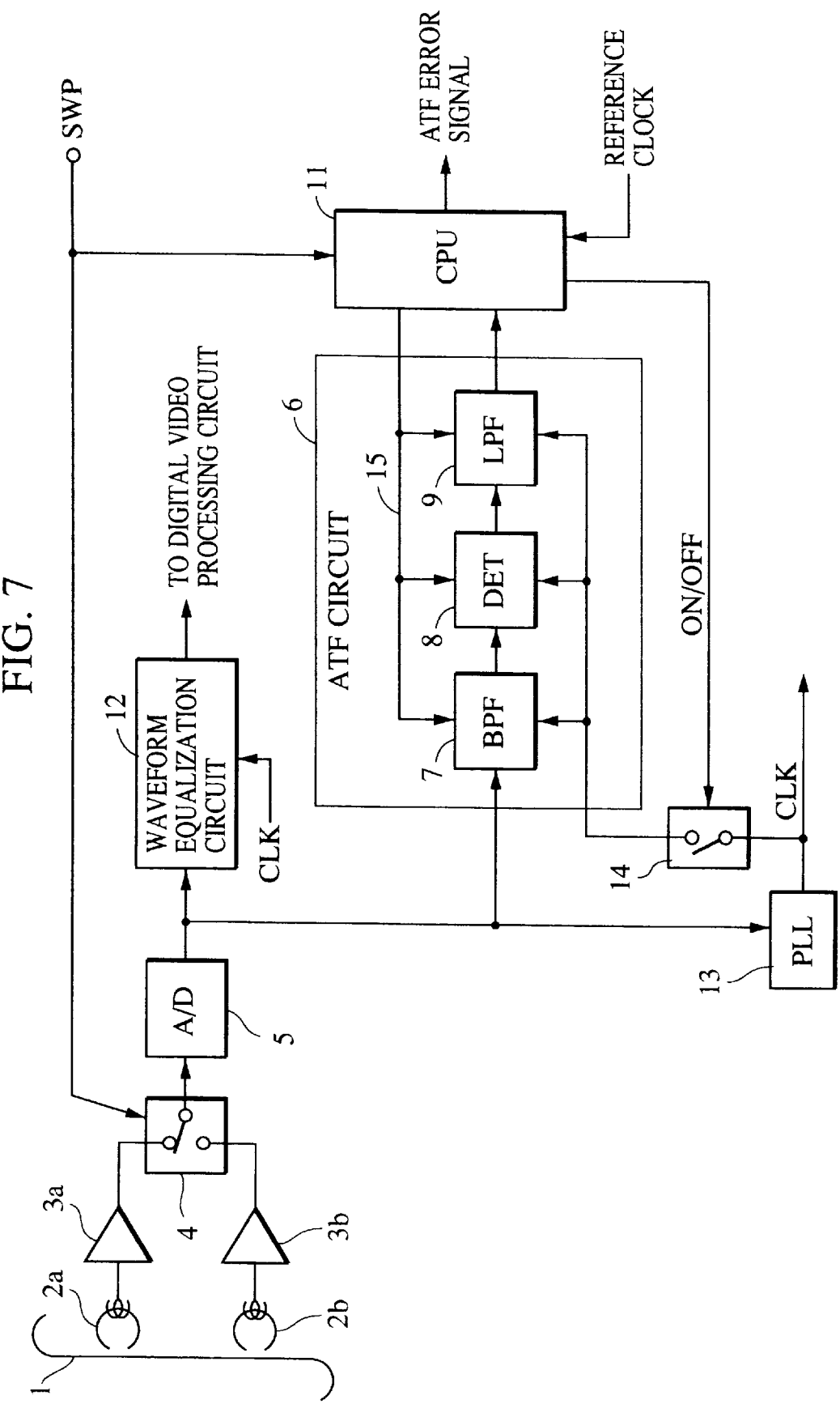
FIG. 7 is a block diagram showing the construction of the reproduction system of a digital VTR as another embodiment of the present invention.

FIG. 7 shows a second embodiment of the present invention.

While in the first embodiment shown in FIG. 4 the ATF circuit 6 is composed of two digital circuit systems for $f_1$ and $f_2$, in the device shown in FIG. 7, the ATF circuit 6 is composed of a single digital circuit system comprising a BPF 7, a detection circuit 8, and an LPF 9. By the control signal 15 output from the control section 11, the digital filter coefficients of the BPF 7 and the LPF 9 and the detection characteristics of the detection circuit 8 are controlled.

Figure 8:
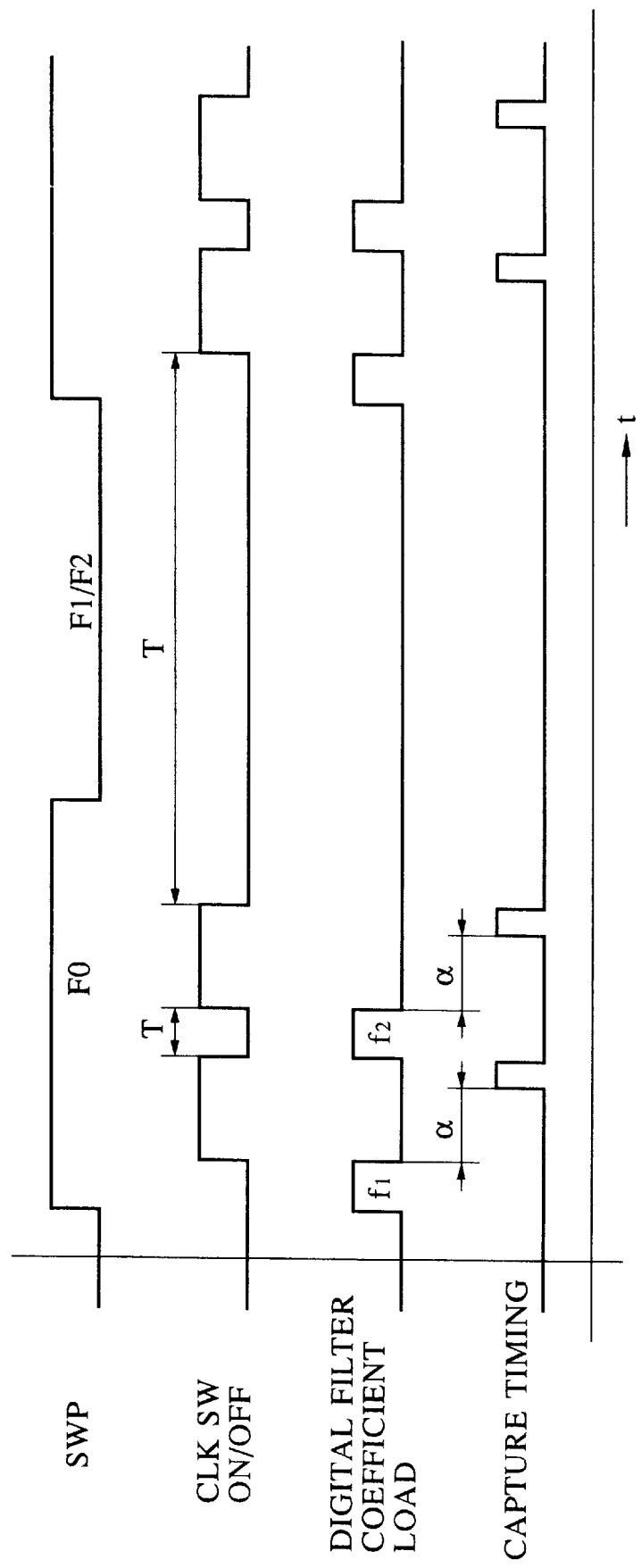
FIG. 8 is a timing chart for illustrating an example of the operation of the device of FIG. 7.

FIG. 8 is an operation timing chart.

As shown in the drawing, during the tracing of the tracks F0, the coefficient of the BPF 7 is first given by the above-mentioned control signal 15 to adjust the filter characteristics such that the $f_1$ is extracted. After this, clocks are supplied, and after a period $\alpha$ has elapsed, the $f_1$ component is taken in and the clock supply is temporarily stopped. Next, the above filter characteristics are changed such that the $f_2$ component is extracted, and then, clocks are supplied. After the elapse of the period α, the f2 component is taken in, and the clock supply is suspended until the completion of the tracing of the tracks F1 and F2.

FIG. 9 is a timing chart for another example of the operation.

In this example, the f1 and f2 components are alternately extracted each time the F0 tracks are traced.

In accordance with this embodiment, the characteristics of the ATF circuit 6 are switched on a time-division basis, whereby the circuit configuration can be further simplified as compared to that of the first embodiment.

In this second embodiment also, the operation stop of the ATF circuit 6 is controlled by turning ON/OFF the power source.

Apart from the above, the timing for the clock supply and the suspension thereof in FIGS. 8 and 9 and FIGS. 5 and 6, according to the first embodiment, allows various modifications.

Further, the characteristics of the various sections of the ATF circuit 6 of FIG. 4 according to the first embodiment may be changed by a control signal from the control section 11. This arrangement, like that of the second embodiment, helps to obtain various filter characteristics in accordance with the operation mode of the VTR.

Further, in the second embodiment, when the ATF error signal is required to have high accuracy, as in the case of the normal reproduction mode, the pass band of the LPF is narrowed, and, when the ATF error signal is required to be quicker in response, as in the case, for example, of the insert recording mode, the pass band of the LPF is widened. In this way, it is possible to effect a variety of modifications in terms of the accuracy, responsiveness, etc. of the ATF signal without involving any increase in the number of parts.

As described above, due to the construction in which the operation of a part of the ATF circuit is switched, it is possible to achieve a reduction in waste of electric power.

Further, by suspending the operation of the ATF circuit for the period in which no pilot signals are extracted, it is possible to obtain the above effect of saving electric power without affecting the tracking control.

Further, by suspending the supply of clocks to the ATF circuit that has a digital construction, or cutting off the power source of the ATF circuit, it is possible to reliably achieve, with a simple circuit construction, an operation suspended state for the ATF circuit.

Further, due to the arrangement in which the characteristics of the digital filter of the ATF circuit having a digital construction are controlled, it is possible to simplify the circuit configuration and, at the same time, various degrees of accuracy and responsiveness of the tracking error signal can be selected by using a single circuit.

In particular, by controlling the characteristics of the digital filter in accordance with the frequencies of the pilot signals, it is possible for a single circuit system to cope with a case in which the pilot signals have a plurality of frequencies, whereby it is possible to realize an ATF circuit with a simple construction and at low cost.

Further, by varying the characteristics of the digital filter in accordance with the operation mode, it is possible to effect, with a single circuit, an optimum setting of the accuracy and responsiveness of the tracking signal.

It is to be understood that the specific embodiments described herein are merely illustrative of the invention and that modifications and changes can readily be made by those skilled in the art without departing from the spirit and scope of the invention.

What is claimed is:

1. A signal reproducing device comprising:
   reproduction means for reproducing given signals recorded on a recording medium in a reproducing period;
   formation means for forming a tracking error signal on the basis of pilot signal components in signals reproduced by said reproduction means, said formation means including filtering means for extracting the pilot signal components; and
   control means for controlling an operation of said filtering means such that power consumed in said filtering means is reduced in a predetermined period when said reproduction means is not reproducing the given signals, relative to the power consumed in another period when said reproduction means is reproducing the given signals.

2. A device according to claim 1, wherein said formation means can form said tracking error signal only in a specific period, and said predetermined period is in a period other than said specific period.

3. A device according to claim 2, wherein a number of parallel tracks are formed on said recording medium, and a plurality of pilot signal components are superimposed on recording signals on every other track.

4. A device according to claim 3, wherein the predetermined period includes a period in which said reproduction means reproduces signals from tracks on which said pilot signal components are superimposed on the recording signals.

5. A device according to claim 4, wherein the predetermined period further includes a part of a period in which said reproduction means reproduces signals from tracks on which said pilot signals are not superimposed on the recording signals.

6. A device according to claim 1, wherein said formation means includes extraction means for extracting the pilot signal components from the signals reproduced by said reproduction means, and computation means for obtaining the tracking error signal on the basis of the pilot signal components extracted by said extraction means.

7. A device according to claim 6, wherein said control means inhibits supplying clock signals to the digital circuit in the predetermined period.

8. A device according to claim 7, wherein said extraction means includes a band pass filter for separating predetermined frequency components from the signals reproduced by said reproduction means, a detection circuit for detecting the output of said band pass filter, and a low-pass filter for filtering a low-frequency component of the output of said detection circuit.

9. A device according to claim 7, wherein said extraction means includes filtering means for alternately extracting said plurality of pilot signal components with different frequencies.

10. A device according to claim 1, wherein said formation means includes a digital circuit, and said control means inhibits supplying clock signals to the digital circuit in the predetermined period.

11. A device according to claim 10, wherein said control means inhibits supplying electric power to said formation means in the predetermined period.

12. A device according to claim 1, further comprising tracking means for controlling a a relative position of said reproduction means with respect to said recording medium on the basis of said tracking error signal.

13. A signal reproducing method comprising the steps of:

reproducing given signals recorded on a recording medium;

extracting pilot signal components from the signals reproduced in said reproducing step by using a filter;

forming a tracking error signal on the basis of said pilot signal components; and inhibiting supplying clocks to a filter in a predetermined period when the given signals are not being reproduced in said reproducing step, so as to reduce power consumption.

14. A signal reproducing device comprising:

reproduction means for reproducing given signals recorded on a recording medium;

extraction means for extracting predetermined frequency signals components from signals reproduced by said reproduction means, said extracting means including a filtering means; and control means for controlling an operation of said filtering means such that said filtering means operates only in a period when said reproduction means is reproducing the given signals, and that electric power consumed in said filtering means is reduced in another period when said reproduction means is not reproducing the given signals.

15. A device according to claim 14, wherein said extraction means includes filtering means for separating said predetermined-frequency components and setting means for setting characteristics of said filtering means, wherein said control means controls said extraction means such that electric power consumed in at least a part of said extraction means is reduced while said setting means sets the characteristics.

16. A device according to claim 15, wherein said filtering means alternately separates components having different frequencies.

17. A signal reproducing device comprising:

reproduction means for reproducing signals recorded on a recording medium;

formation means for forming a tracking error signal on the basis of pilot signal components in signals reproduced by said reproduction means, said formation means including a digital filter for extracting the pilot signal components from the reproduced signals; and control means for adjusting a passband bandwidth characteristic of said digital filter.

18. A device according to claim 17, wherein said digital filter alternately separates a plurality of pilot signal components, and wherein said control means varies the characteristics of the digital filter in accordance with frequencies of the pilot signals separated by said digital filter.

19. A device according to claim 17, further comprising tracking means for controlling a a relative position of said recording medium with respect to said reproduction means in accordance with said tracking error signal.

20. A device according to claim 17, wherein said control means controls the frequency response characteristics of said digital filter in response to a manual operation.

21. A device according to claim 20, wherein a plurality of parallel tracks are formed on said recording medium, two different pilot signal components of different frequencies are superimposed on every other track among the parallel tracks, and said formation means compares said two different pilot signal components separated by said digital filter to form the tracking error signal in accordance with a result of the comparison.

22. A device according to claim 17, wherein said formation means includes a band pass filter for separating a predetermined-frequency component from the signals reproduced by said reproduction means, a detection circuit for detecting an output of said band pass filter, and a low-pass filter for filtering a low frequency component output of said detection circuit.

23. A device according to claim 22, wherein said control means controls characteristics of said band pass filter.

24. A device according to claim 22, wherein said control means controls characteristics of said low-pass filter.

25. A signal reproducing method, comprising steps of:

reproducing signals recorded on a recording medium;

forming a tracking error signal in a tracking error signal forming unit responsive to pilot signal components of the signals being reproduced, the tracking error signal forming unit including a filter, and controlling an operation of said filtering means to reduce power consumption in said filtering means in a predetermined period when said reproducing step is not being performed.

26. A signal reproducing method, comprising the steps of:

reproducing signals recorded on a recording medium;

forming a tracking error signal in a tracking error signal forming unit responsive to pilot signal components of the signals being reproduced using a digital filter; and controlling the tracking error signal forming unit by varying a passband bandwidth characteristic of the digital filter.

\* \* \* \* \*

UNITED STATES PATENT AND TRADEMARK OFFICE
CERTIFICATE OF CORRECTION

PATENT NO.    : 6,141,177
DATED         : October 31, 2000
INVENTOR(S)   : Toshiya Yatomi, et al.

It is certified that error appears in the above-identified patent and that said Letters Patent is hereby corrected as shown below:

COVER PAGE:
Under [56] References Cited, U.S, Patent Documents,
 "5,140,571    8/1992 Nihida et al." should read
 --5,140,571   8/1992 Nishida et al. --.

COLUMN 2:
Line 2, "of" (first occurrence) should be deleted.

COLUMN 6:
Line 65, "a" (second occurrence) should be deleted.

Signed and Sealed this

Twelfth Day of June, 2001

Attest:

NICHOLAS P. GODICI
*Attesting Officer*    *Acting Director of the United States Patent and Trademark Office*

UNITED STATES PATENT AND TRADEMARK OFFICE
CERTIFICATE OF CORRECTION

PATENT NO. : 6,141,177
DATED : October 31, 2000
INVENTOR(S) : Toshiya Yatomi, et al.

It is certified that error appears in the above-identified patent and that said Letters Patent is hereby corrected as shown below:

Title Page:
Under [56] References Cited, U.S. Patent Documents,
"5,140,571     8/1992   Nihida et al." should read
--5,140,571    8/1992   Nishida et al. --.

Column 2:
Line 2, "of" (first occurrence) should be deleted.

Column 6:
Line 65, "a" (second occurrence) should be deleted.

Signed and Sealed this

Twenty-sixth Day of June, 2001

Attest:

NICHOLAS P. GODICI
*Attesting Officer*        *Acting Director of the United States Patent and Trademark Office*